UNITED STATES PATENT OFFICE.

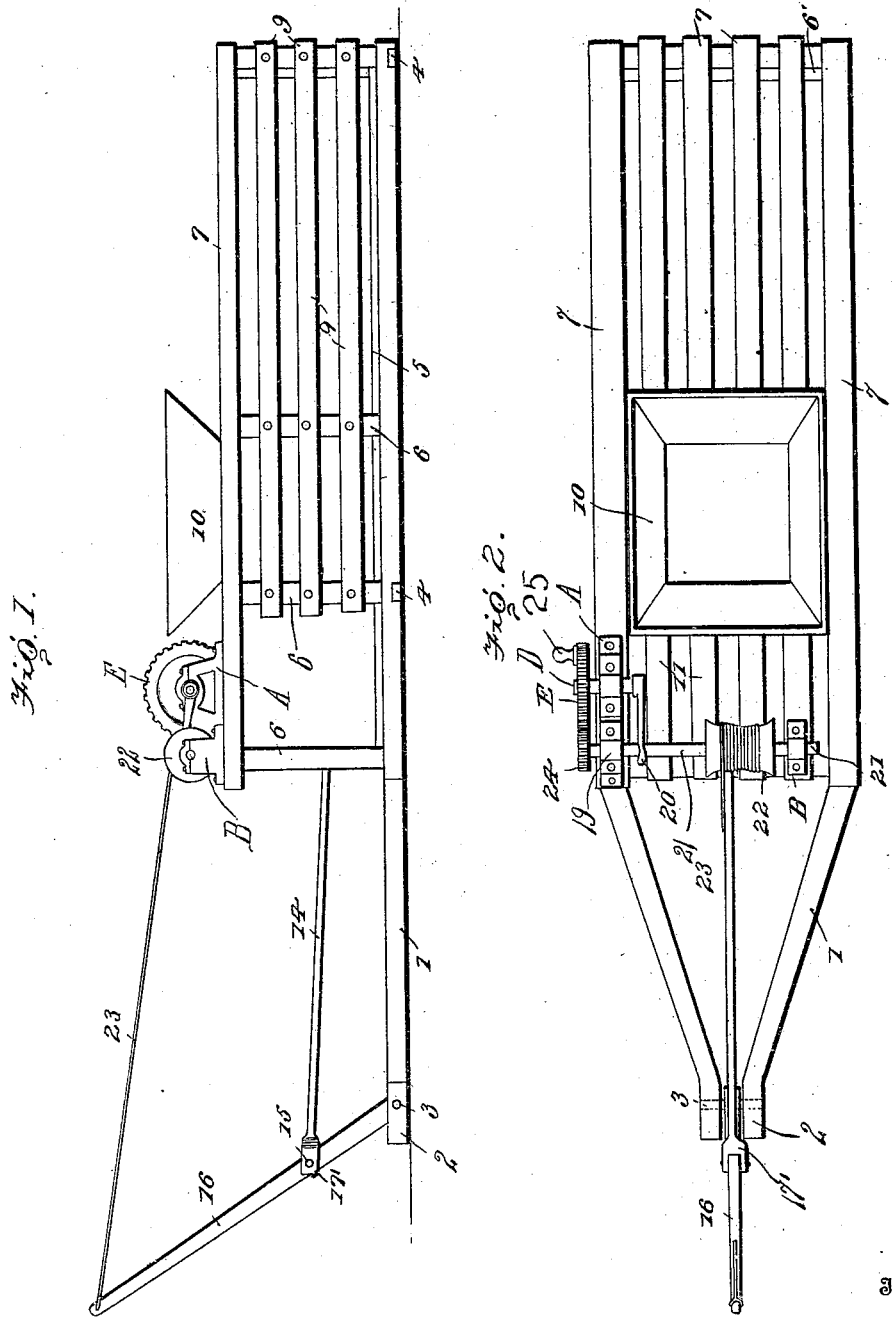

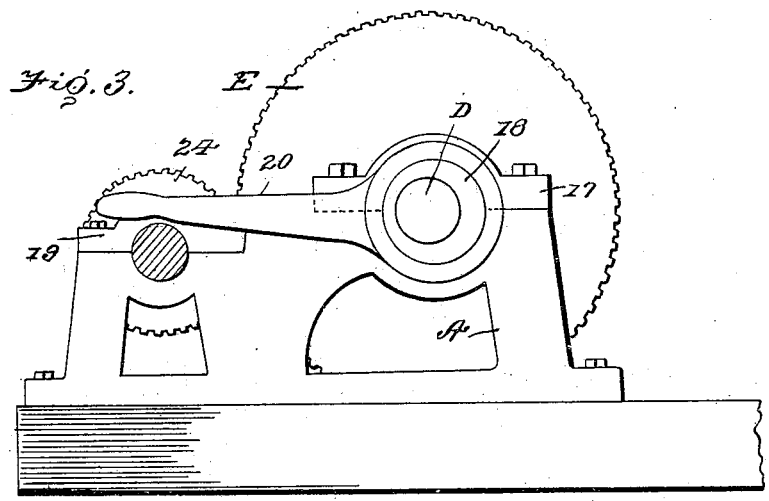
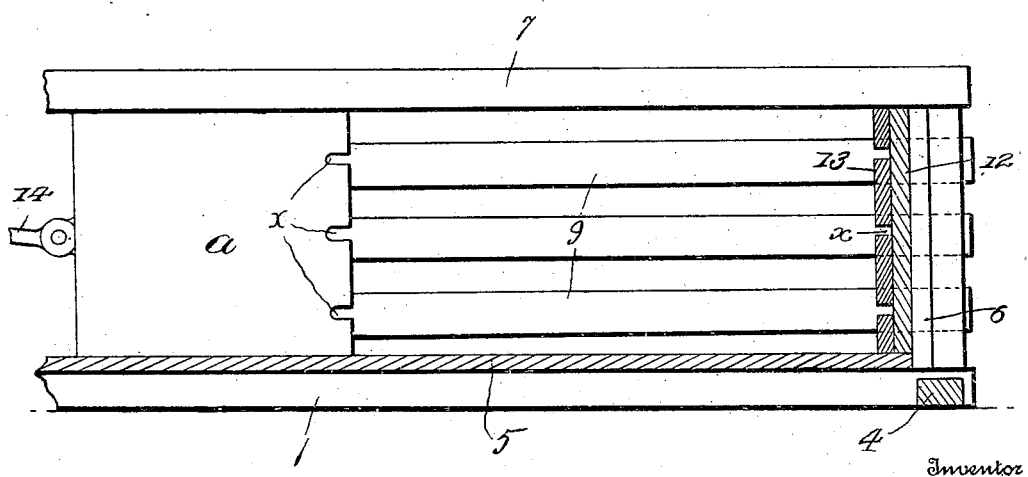

CHESTER D. CLARK, OF MAPLE, FLORIDA.

HAY-PRESS.

961,102.  Specification of Letters Patent.  Patented June 14, 1910.

Application filed March 14, 1908, Serial No. 421,193. Renewed November 9, 1909. Serial No. 527,073.

*To all whom it may concern:*

Be it known that I, CHESTER D. CLARK, a citizen of the United States, residing at Maple, in the county of Citrus, State of Florida, have invented certain new and useful Improvements in Hay-Presses; and I do hereby declare the following to be a full, clear, and exact description of the invention, such as will enable others skilled in the art to which it appertains to make and use the same.

This invention has relation to a new and useful improvement in hay presses.

The object of my invention is to provide a hay press adapted to be manually operated, which will be light and simple of construction and in which the factors of simplicity of design and durability of construction have been kept in view.

In the accompanying drawings I have shown in Figure 1, a side view of a hay press embodying my invention. Fig. 2 is a top view. Fig. 3 shows an enlarged detached detail of the operating shaft support and Fig. 4 shows a broken view of the plunger and follower, disclosing the wire slots.

In carrying out the object of my invention I use two side sills 1, 1. At their forward ends these side sills converge toward one another to form the securing head 2 carrying a supporting pin 3 as disclosed in Fig. 2. These sills 1 are connected by means of suitable transverse bars 4 as shown in Fig. 1, which in turn support the bottom boards 5 of the hay press. Extending upward from these side sills are a plurality of standards 6 which at their upper ends are connected to the supporting bars 7.

Along opposite sides the standards 6, 6 support the slats 9, while the supporting bars 7 above hold the hopper 10, a plurality of stub-slats 11 extending from the hopper rearwardly as shown in Fig. 2. The end standards 6' as shown in Fig. 4 are adapted to form a stop to the end gate against which the hay is pressed in baling the same. This end gate comprises the vertical members 12 and the horizontally disposed members 13 so connected as to provide the three slots $x$ as is disclosed in Fig. 4.

Held within the forward portion of the baling press is the baling head $a$ to which is pivotally secured the connecting rod 14, which at its forward end by means of a pin 15 is secured to the lever 16, the head 17' of this connecting rod 14 being bifurcated as shown in Fig. 2.

Secured to the top of the baling press frame and held upon one of the supporting bars is a bracket A. This bracket is provided with a bearing 17 adapted to support a bearing disk 18 while the bearing 19 also forms a part of this bracket. Held within the bearing 17 is a bearing disk 18 provided with the operating handle 20, this disk 18 being revolubly held and made to give support to the eccentrically held stub-shaft D carrying the driving gear E as disclosed.

Secured to the top of the baling press is a bearing bracket B which in conjunction with the bearing 19 supports a drum shaft 21 carrying a suitable drum 22. Extending from this drum 22 is an operating strand or cable 23 secured to the upper end of the lever 16 as shown in Fig. 1.

The drum shaft 21 is made to carry a gear 24 which meshes with the gear E as disclosed in Fig. 2.

When the instrumentalities have been properly assembled the operation of my device is as follows: The hay is fed through the hopper 10 into the baling chamber. The gear E is then operated by means of the handle 25 to rotate the smaller connected gear 24 to tilt the lever 16 whereby the connected baling head $a$ is advanced to carry the hay below the hopper into the baling chamber. Now in order to carry the baling head $a$ into its original position to permit the hopper to receive a new charge, the operator grasps the lever 20 and throws the same backward which results in rotating the disk 18 and thereby carries the eccentrically held stub-shaft D outward, which results in the unmeshing of the gears E and 24. The lever 16 is then tilted forward which results in the unwinding of the cable 23. After the baling head $a$ has been carried into its advanced position, the operator then again actuates the lever 20 to carry the same into its original position thereby bringing the gears into mesh again. The handle 20 normally rests upon the drum shaft 21 as shown in Fig. 1.

After a suitable amount of hay has been compressed, the bale is wired by passing suitable baling wire through the openings $x$ within the baling head and the tail-gate 13 and then securing this wire as is usual in the art.

After the bale has been wired, the end gate may be removed by loosening the bolts which hold the slats 9 and the rear standards 6 together. These standards 6 may then be removed and the end gate taken from its position. The bale is then withdrawn and the parts replaced.

And having thus described my said invention what I claim is—

1. The combination in a device of the character described having extending base sills, of a baling head, a connecting rod extending from said head, a lever pivotally secured to said base sills, bearing brackets carried by said hay press, a drum shaft within said brackets, a drum on said shaft, a revolubly held bearing disk, a stub shaft eccentrically carried by said disk, a gear on said drum shaft and a strand extending from said drum to said lever, all arranged as set forth.

2. The combination in a device of the character described, of an extending sill, a lever pivoted to said sill, a baling head, a connecting rod extending from said head, and being secured to said lever, a bracket, an eccentrically held stub shaft, a gear carried by said stub shaft, a suitably supported drum shaft, a drum on said shaft, a pliable connection extending from said drum to said lever, a pinion on said drum shaft meshing with said gear, and means to actuate said stub shaft, as and for the purpose set forth.

In testimony whereof, I affix my signature, in presence of two witnesses.

CHESTER D. CLARK.

Witnesses:
M. P. CLARK,
J. F. CLARK.